Oct. 16, 1923.
A. B. McCONNELL ET AL
1,471,181
RECORDING ATTACHMENT FOR SCALES
Filed Sept. 19, 1919    2 Sheets-Sheet 1
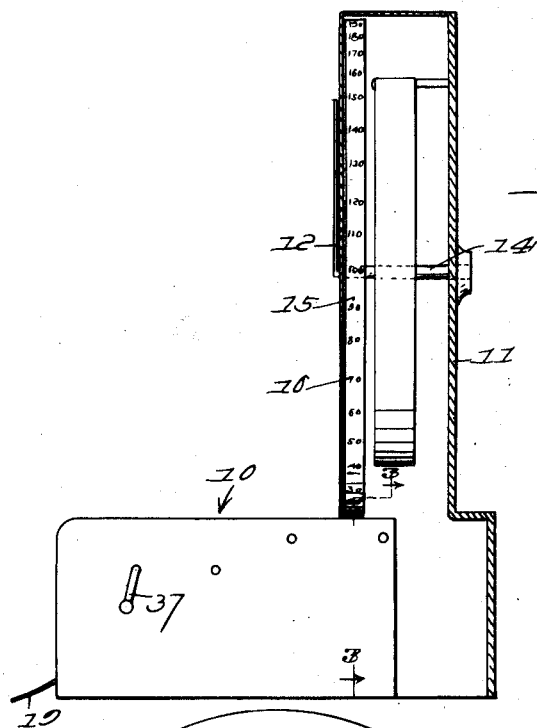
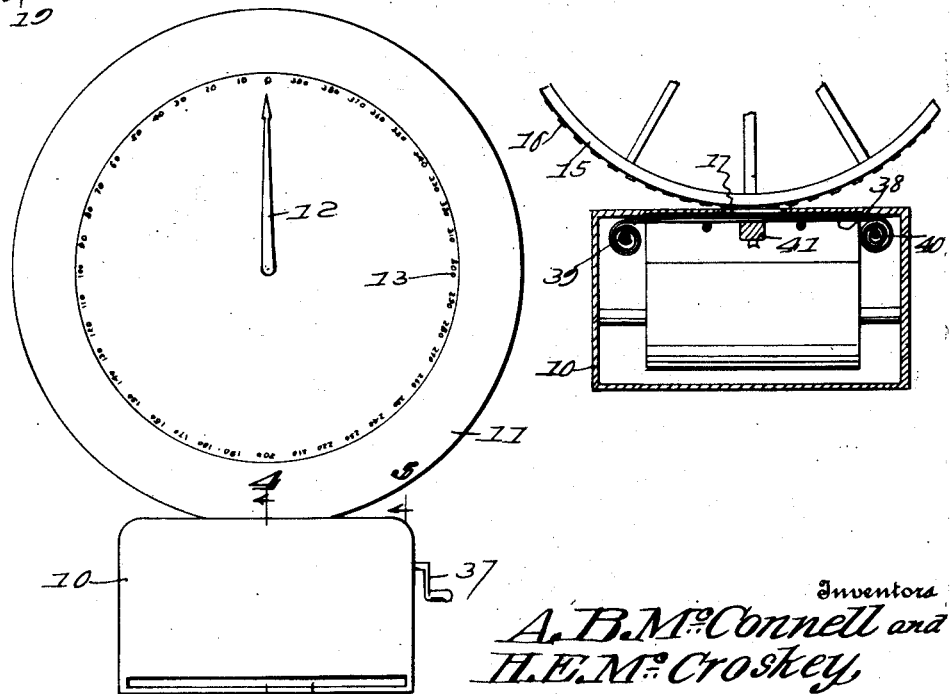
Inventors
A. B. McConnell and
H. E. McCroskey,
By G. Hume Talbert
Attorney Oct. 16, 1923.

A. B. McCONNELL ET AL 1,471,181

RECORDING ATTACHMENT FOR SCALES

Filed Sept. 19, 1919 2 Sheets-Sheet 2

Inventors
A. B. McConnell and
H. E. McCroskey,

By
Attorney

Patented Oct. 16, 1923.

1,471,181

UNITED STATES PATENT OFFICE.

ANDREW B. McCONNELL AND HARRY E. McCROSKEY, OF OMAHA, NEBRASKA.

RECORDING ATTACHMENT FOR SCALES.

Application filed September 19, 1919. Serial No. 324,889.

*To all whom it may concern:*

Be it known that we, ANDREW B. MCCONNELL and HARRY E. MCCROSKEY, citizens of the United States of America, residing at Omaha, in the county of Douglas and State of Nebraska, have invented new and useful Improvements in Recording Attachments for Scales, of which the following is a specification.

The object of the invention is to provide a simple and relatively inexpensive recording attachment for use in connection with scales and other weighing devices whereby a printed record of a weight registered by the scale may be produced under conditions which will insure the accuracy of the record with the minimum effort and loss of time upon the part of the operator and to this end the invention consists in a construction and combination of parts of which one embodiment, applicable to scales of the type having a rotary index is illustrated in the accompanying drawing, it being understood that changes in form and proportions may be resorted to within the scope of the claims without departing from the principles involved.

In the drawing:

Figure 1 is a side view of the same applied in the operative position to a scale of which the latter is shown partly in section.

Figure 2 is a front view of the same.

Figure 3 is a detail section on the plane indicated by the line 3—3 of Figure 1.

Figure 4 is a section on the plane indicated by the line 4—4 of Figure 2.

Figure 5 is a section on the plane indicated by the line 5—5 of Figure 2.

Figure 6 is a section on the plane indicated by the line 6—6 of Figure 5.

Figure 7 is a detail view of the cutter detached.

In order to guard against accidental disarrangement or surreptitious manipulation of the parts of the mechanism the operating elements thereof are preferably arranged within a casing 10 which may be conveniently attached to the frame 11 of a scale of any of the ordinary types now in common use wherein there is employed a rotary index 12 traversing a suitable scale 13 for indexing units of weight and to this index or preferably the spindle 14 thereof is attached a printing wheel 15 having peripheral printing type 16 corresponding with the graduations of the scale 13 and adapted to be successively presented at an opening 17 in the top wall of the casing in correspondence with the notations of the weighing scale designated by the index.

Disposed within the casing is a stock roll or drum 18 carrying a strip 19 of paper or equivalent material guided as by rolls 20 and 21 to traverse the opening 17 and thence carried between feed rolls 22 and 23 to an outlet 24 where the end of the strip projects and may be grasped by the operator. Adjacent to the outlet the strip traverses a guide 25 serving to direct the forward end of the strip through the opening and having a bevelled surface 26 spaced from the wall 27 of the casing to form a sheath 28 for the reception of the cutting edge of a knife 29 which is mounted by means of guides 30 on said wall of the casing for reciprocatory movement across the outlet opening to periodically sever the strip to form tickets. The knife is actuated by means of a coiled spring 31 or its equivalent against the tension of which the knife is normally held in an elevated or inoperative position by means of an arm 32 arranged in operative relation with a cam 33 operatively connected by gears 34 and 35 with an operating shaft 36 to one end of which is attached a crank arm 37 located exteriorly of the casing.

Mounted to extend across the printing opening 17 in the casing and adapted for progress in a direction transverse to that of the record strip 19 is a carbon or inking ribbon 38 supported for example by rolls 39 and 40, and mounted to operate through the printing opening so as to force the carbon or inking ribbon and the record strip toward the type carrying surface of the printing disk 15 is an oscillatory platen 41 pivotally mounted, as at 42, and having an operating arm 43 subject to the pressure of a compression spring 44. When the spring is fully extended, the platen 41 is spaced a short distance from the inking ribbon 38, but when the spring is compressed, as it must be to effect the printing operation, the platen is moved farther away from the printing device and on release of the arm the spring expands and the platen, due to its inertia is thrown into contact with the printing ribbon and the printing operation effected, the spring thereafter assuming its normal extension and leaving the platen spaced from the ribbon.

In order to effect the operation of the platen, there is arranged in operative relation with the arm 43 a trip 45 constructed in the form of a rocker, pivoted as at 46, and having an arm 47 arranged in the path of a tappet pin 48 carried by a gear 49 connected through an intermediate gearing, indicated at 50, with the shaft 36. The trip 45 is provided with a nose or terminal 45ª having a rule joint connection with the body portion of the trip so that when the latter is actuated by the tappet pin 48, the arm 43 is depressed and since the arm assumes its normal position prior to the trip returning to its normal position, the rule joint connection of the nose will permit the latter to swing downwardly to clear the extremity of the arm so that the trip may assume its normal position with the nose above the extremity of the arm. A stop pin 47ª is arranged in the path of the arm 47 to preclude movement of the trip in one direction. This pin, however, is spaced a sufficient distance from the normal position of the arm 47 to permit the trip to swing sufficiently for the nose to clear the extremity of the arm 43 in swinging the trip to normal position.

In operation, when the weighing of an article has been completed, and the index has reached a condition of rest, the crank 37 may be turned to cause the operation of the rocker by the engagement of the pin 48 therewith, to depress the arm 43, and upon the release of the latter the spring 44 causes an upward swinging movement of the platen which drives the record strip and inking ribbon toward the printing disk to produce an impression upon the record strip corresponding with the printing characters presented at the opening 17, and a continued operation of the crank will feed the strip 19 through the outlet 24 until the cam 33, releasing the arm 32 permits an operative movement of the knife to sever the strip and detach a ticket bearing printed characters representing the weight which has been indicated by the index of the scale.

It will be obvious that the operation thus described can be performed in a relatively short space of time by a few revolutions of the operating crank and will result in the production of a record which indicates with the utmost accuracy the position which the printing disk occupied at the completion of the weighing operation, and therefore, the exact weight of the commodity, and the balance of the surface of the ticket may be utilized for notations or as a space to receive the name or business card of the merchant or the name and address of the purchaser as may be preferred.

What is claimed is:

1. In a device for the purpose indicated, the combination with a rotating scale formed with peripheral printing characters corresponding to the characters on the scale, of a housing provided with an opening in its top wall disposed to face the characters on the periphery of the scale, a ribbon mounted on spaced rollers and passing before the opening, an oscillatory platen disposed below the ribbon, a stock roll mounted in the casing, a record strip mounted on the stock roll, idler rollers by means of which the record strip is passed between the ribbon and the periphery of the scale and across the opening in the housing, the latter being formed with an outlet through which the record strip projects, a spring normally impelling the platen towards the printing elements of the scale, an angular trip member pivotally mounted in the casing, a rotatably mounted wheel provided with a tappet pin to engage an arm of the trip member to repress the spring to retract the platen, an exteriorly exposed operating crank mounted in the casing, operative connections between said crank and said wheel whereby rotary movement imparted to the crank may operate said trip, and severing means for the record strip disposed adjacent the outlet of the casing and operatively connected with said crank.

2. In a device for the purpose indicated, the combination with a rotating scale formed with printing characters corresponding to the characters on the scale, of a casing, a stock roll mounted in the casing, a record strip carried on the stock roll and moving before the printing characters on the scale, an oscillating platen and inking means for the characters whereby imprints may be made upon the record strip, the casing being provided with an outlet, guides provided adjacent said outlet, a knife slidably mounted in said guides, springs connected with said knife and tending to draw the latter across the opening for the severing of the record strip, a cam within the casing, a crank exterior to the casing and connected with the cam for the rotation of the latter and also operatively connected with the platen, and an arm carried by the knife and playing on the surface of said cam for the purpose specified.

In testimony whereof they affix their signatures.

ANDREW B. McCONNELL.
HARRY E. McCROSKEY.